(12) United States Patent
Onoue (10) Patent No.: US 6,322,407 B1
(45) Date of Patent: Nov. 27, 2001

(54) MARINE DRIVE TRANSMISSION

(75) Inventor: Akihiro Onoue, Shizuoka (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/458,395

(22) Filed: Dec. 10, 1999

(30) Foreign Application Priority Data

Dec. 11, 1998 (JP) .................................................. 10-352887
Jan. 26, 1999 (JP) .................................................. 11-017372

(51) Int. Cl.$^7$ .................................................. B63H 21/28
(52) U.S. Cl. .................................................. 440/52; 440/83
(58) Field of Search .................................. 440/52, 53, 83, 440/900; 464/83, 91, 157, 160

(56) References Cited

U.S. PATENT DOCUMENTS

| 1,422,929 | * | 7/1922 | Cooke | ..................................... 464/83 |
| 4,747,796 |  | 5/1988 | Iwai et al. . |  |
| 4,772,245 | * | 9/1988 | Readman et al. | ....................... 464/89 |
| 4,787,868 | * | 11/1988 | Hoshiba et al. | ........................ 440/52 |

* cited by examiner

Primary Examiner—Ed Swinehart
(74) Attorney, Agent, or Firm—Knobbe, Martens, Olson, & Bear, LLP (57) ABSTRACT

A marine drive transmission includes an improved shock-absorbing coupling mechanism. Engine power is transmitted to a propulsion device through a drive shaft and driven shaft. The drive shaft is coupled to the driven shaft by a coupling arrangement which has a first coupling mechanism and a second coupling mechanism. The second coupling mechanism is spaced apart from the first coupling mechanism in a direction along a common axis of the shafts. The shafts are coupled with each other selectively by one of the first and second coupling mechanisms. The first coupling mechanism desirably includes an elastic member or a viscosity coupling. The second coupling mechanism desirably includes a toothed mechanism, which functions as the primary coupling between the drive and driven shafts (i.e., overrides the first coupling) once a predetermines load has been applied to the drive shaft.

42 Claims, 6 Drawing Sheets

MARINE DRIVE TRANSMISSION

PRIORITY INFORMATION

This application is based on and claims priority to Japanese Patent Application No. 10-352887, filed Dec. 11, 1998, and to Japanese Patent Application No. 11-17372, filed Jan. 26, 1999, the entire contents of which are hereby expressly incorporated by reference.

BACKGROUND OF THE INVENTION

1. Field of the Invention

This invention relates to a marine drive transmission, and more particularly to a relatively compact marine drive transmission that smoothly shifts into both the forward or reverse drive conditions.

2. Description of Related Art

A wide variety of marine propulsion units propel watercrafts. For instance, outboard motors commonly power boats and other watercraft. Stem drive units, which include an inboard motor and an outboard drive, also are often used to power boats and watercraft.

An outboard motor conventionally includes a power head at the top of the drive unit. The power head includes an internal combustion engine having an output shaft extending generally vertically. A driveshaft housing of the drive unit depends from the power head and encloses a driveshaft that extends generally vertically from the output shaft. A lower unit further depends from the driveshaft housing. A propeller shaft is provided therein and extends generally horizontally. The driveshaft and the propeller shaft are connected in the lower unit so that the propeller shaft extends normal to the driveshaft. A propulsion device such as, for example, a propeller is affixed to an outer end of the propeller shaft. A bevel gear transmission, for example, is provided between the driveshaft and the propeller shaft that includes a forward, neutral, reverse shift mechanism for switching over to one of forward, neutral and reverse positions from another position. The engine power is transmitted to the propeller through the output shaft, driveshaft, bevel gear transmission and propeller shaft. The propeller, thus, can propel the outboard motor and the associated watercraft in both forward and reverse directions, if the shift mechanism is not in the neutral position.

An outboard section of the stem drive unit has a construction similar to that of the outboard motor except that it has no engine atop thereof. The engine is placed in the hull of the associated watercraft. A propulsion device of the stem drive unit, which typically is a propeller, is powered by the engine through the driveshaft and propeller shaft combination (i.e., drive train arrangement) similar to that of the drive unit of the outboard motor.

Consumers continue to desire more powerful marine drives and prefer large propulsion units having engines which produce high horsepower. An engine, for example, which operates on a four stroke principle and having a plurality of cylinders, can provide the desired increased horsepower.

However, due to carrying such a large engine, the marine propulsion unit tends to jolt the occupants of the watercraft when the shift mechanism is operated and thereby gives the occupants an uncomfortable feeling. That is, since the large-sized engine generates a relatively large propulsion force, it gives rise an uncomfortable shock to the occupants by abrupt change of the propulsion force particularly when the shift mechanism is shifted from the neutral position to the forward drive position or to the reverse drive position.

Figure 1:
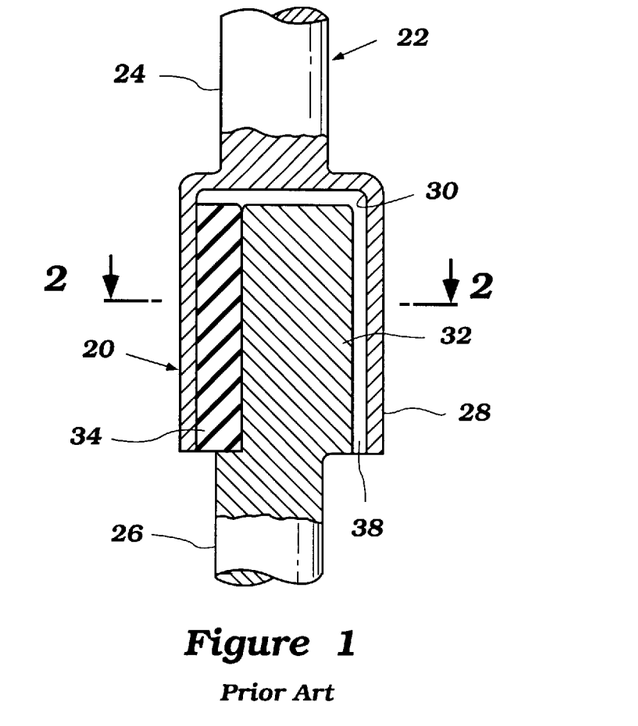
FIG. 1 is a cross-sectional, side elevational view showing the coupling.
Figure 2:
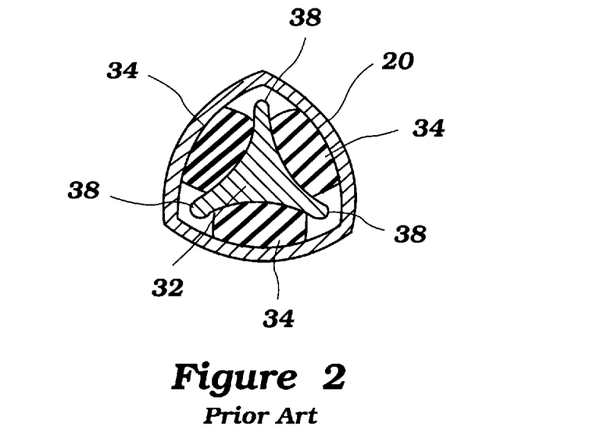
FIG. 2 is a cross-sectional view showing the same coupling taken along the line 2—2 in FIG. 1. These figures are provided in order to assist the reader's understanding of the prior art and for the reader to better appreciate the aspects, features and advantages associated with the present invention.

In order to address this problem, a smoothing device for the shifting operation has been proposed in U.S. Pat. No. 4,747,796. FIGS. 1 and 2 illustrate this type of coupling and correspond to FIGS. 11 and 12 of U.S. Pat. No. 4,747,796. FIGS. 1 illustrates a cross-sectional, side elevational view of a conventional coupling 20 arranged to absorb the shock, and FIG. 2 illustrates a cross-sectional view of the same coupling 20 taken along the line 2—2 in FIG. 1.

With reference to these figures, a driveshaft 22 is divided into a drive section 24 and a driven section 26 and the coupling 20 is provided therebetween to couple them. The lower end of the drive section 24 has a depending flange 28 that defines an internal cavity 30. The upper end of the driven section 26 has a projecting portion 32 that extends into the cavity 30. Three blocks of elastic members 34 are interposed between the internal cavity 30 and the projecting portion 32. As seen in FIG. 2, the flange 28 and its internal cavity 30 have a generally triangular configuration. The projecting portion 32 is also triangular in shape with three apices 38.

The coupling 20 provides vibration damping and force absorption under low speed and load conditions. This damping is provided by the elastic members 34 that are compressible by certain compressive force exerted thereupon. When the driving loads are increased, the elastic members 34 are extremely compressed and the apices 38 of the projecting portion 32 directly contact inner cavity 30 of the flange 28 of the drive portion 24. The torque of the drive section 24 is transmitted to the driven section 26 by this connection.

Because the transmission shifting shock occurs under the low speed condition, the coupling 20 is quite useful for preventing the shock from occurring when the shift mechanism is shifted. However, another problem appears with this coupling 20. The problem is that the driving force is not securely transferred from the drive section 24 to the driven section 26 when the driving loads increase. Because the driving force is conveyed by the contacts of the apices 38 with the inner cavity 30 and these contacts are not so reliable. Of course, the elastic members 34 are also involved in this force transferring mechanism. However, the elastic members 34 are slippery in the cavity 30 and do not increase reliability.

SUMMARY OF THE INVENTION

It may improve this situation to increase contact areas of the apices 38 with the cavity 30 or to employ elastic members that have large volume. Both of the improvements, however, would need a large size of housing and would thereby interfere with the arrangement of other components disposed in the housing. A need therefore exists for a marine drive transmission that can absorb a shock generated when a forward, neutral, reverse shift mechanism is shifted, with a structure as compact as possible. In addition, after the shift mechanism is shifted into the forward or reverse position, the coupling desirably securely transmits the driving force from a drive section to a driven section.

In accordance with one aspect of the present invention, a power transmission system for a marine propulsion unit comprises a first shaft arranged to be driven by a powering element. A second shaft is driven by the first shaft. The first shaft and the second shaft have a common axis. A propulsion device is arranged to be driven by the second shaft for propelling the marine propulsion unit. A first coupling mechanism and a second coupling mechanism are provided for coupling the first shaft and the second shaft. A second coupling mechanism is spaced apart from the first coupling mechanism in a direction along the common axis. The first shaft and the second shaft are coupled with each other selectively by one of the first coupling mechanism and a second coupling mechanism.

In accordance with another aspect of the present invention, a coupling for a power transmission system which includes a drive shaft and a driven shaft. The coupling comprises a first section continuously connecting the drive shaft with the driven shaft. A second section engages the drive shaft with the driven shaft when the driven shaft is driven by the drive shaft under a driving load condition that is greater than a predetermined level. The second section overrides the first section after the drive shaft is engaged with the driven shaft, i.e., the second section takes precedence over the first section as the primary mechanism for transferring torque from the drive shaft to the driven shaft. The drive shaft and the driven shaft have a common axis. The second section is spaced apart from the first section in a direction along the common axis.

Further aspects, features and advantages of this invention will become apparent from the detailed description of the preferred embodiments which follow.

BRIEF DESCRIPTION OF THE DRAWINGS

As noted above,

FIGS. 1 and 2 illustrate a conventional coupling.

DETAILED DESCRIPTION OF THE PREFERRED EMBODIMENTS OF THE INVENTION

Figure 3:
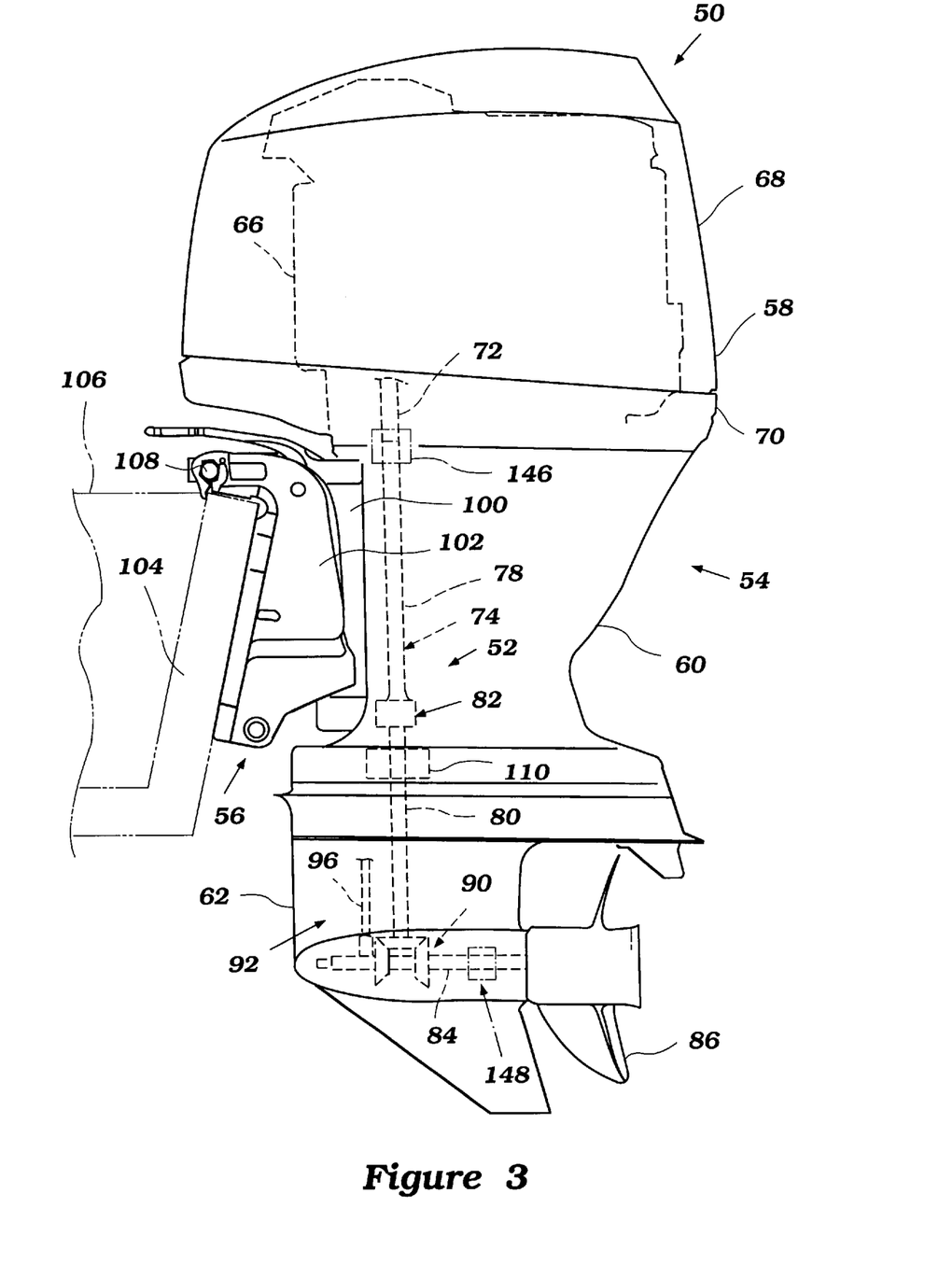
FIG. 3 is a side elevational view showing an outboard motor which can employ a power transmission system in accordance with a preferred embodiment of this invention. An associated watercraft is sectioned in part and shown in phantom.

With reference to FIG. 3, an outboard motor, designated generally by reference numeral 50, includes power transmission system 52 therein, which is configured in accordance with a preferred embodiment of the present invention. Although the present invention is shown in the context of an outboard motor, various aspects and features of the present invention also can be employed with other types of marine propulsion units (e.g., a stem drive unit).

In the illustrated embodiment, the outboard motor 50 comprises a drive unit 54 and a bracket assembly 56. The drive unit 54 includes a power head 58, a driveshaft housing 60 and a lower unit 62. The power head 58 is disposed atop of the drive unit 54 and includes an internal combustion engine 66, top protecting cowling 68 and bottom protective cowling 70. The engine 66 powers a propulsion device of the outboard motor 50. Although any types of engines are applicable, the outboard motor 50 employs, for example, a V6 cylinder engine (two banks and three cylinders for each bank) operating on a four stroke principle. In the illustrated form, the engine 66 has an output shaft or crankshaft 72 extending generally vertically. The top and bottom cowlings 68, 70 generally completely enclose the engine 66. The top cowling 68 is detachably affixed to the bottom cowling 70 to permit access to the engine for maintenance or other purposes.

The driveshaft housing 60 depends from the power head 58 and supports a driveshaft 74 which is driven by the output shaft 72 of the engine 66. The driveshaft 74 extends generally vertically through the driveshaft housing 60. The driveshaft 74 in this embodiment is divided into two parts. One of the parts is a first shaft or drive section 78, while the other one is a second shaft or driven section 80. A coupling assembly 82 which incorporates a principal aspect of the present invention couples the drive section 78 to the driven section 80. The coupling assembly 82 will be described in more detail later with reference to FIGS. 4, 5 and 6, which show a first embodiment, and to FIG. 9 which shows another embodiment of the present invention.

The lower unit 62 depends from the driveshaft housing 60 and supports a propeller shaft 84 which is driven by the driveshaft 74 (in particular the driven section 80). The propeller shaft 84 extends generally horizontally through the lower unit 62. In the illustrated embodiment, the propulsion device includes a propeller 86 that is affixed to an outer end of the propeller shaft 84 and is driven thereby. A bevel gear transmission 90 is provided between the driveshaft 74 and the propeller shaft 84. The bevel gear transmission 90 couples together the two shafts 74, 84 which lie generally normal to each other (i.e., at a 90° shaft angle). The transmission 90 includes a forward, neutral, reverse shift mechanism 92 to shift rotational directions of the propeller 86 (forward and reverse positions) or to decouple the propeller 86 from the engine 66 (a neutral position). The shift mechanism 92 has a shift rod 96 extending generally vertically toward the power head 58. A conventional shift cable (not shown) that is connected to the shift rod 96 extends generally horizontally and forwardly so that the operator can select one of the shift positions. The bevel gear transmission 90, including the shift mechanism 92, is similar to that illustrated in FIG. 9, which will be described in greater detail later and which also shows another embodiment of this invention.

The bracket assembly 56 comprises a swivel bracket 100 and a clamping bracket 102. The swivel bracket 100 supports the drive unit 54 for pivotal movement about a generally vertically extending axis. The clamping bracket 102, in turn, is affixed to a transom 104 of an associated watercraft 106 for pivotal movement about a generally horizontally axis, i.e., an axis of a pivot shaft 108.

As used through this description, the terms "forward" and "forwardly" mean at or to the side where the clamping bracket 102 is located and the terms "rearward,"

"rearwardly," "backwardly" and "reverse" mean at or to the opposite side of the forward side, unless indicated otherwise.

Although not shown, a hydraulic tilt cylinder assembly is provided between the swivel bracket 100 and the clamping bracket 102. The cylinder assembly is hydraulically operable and tilt up or down the drive unit 54 relative to the transom 104 of the associated watercraft 106.

The outboard motor 50 employs a cooling system arranged to cool the engine 66 and other heated components. A water pump 110 is provided for introducing water from the body of water surrounding the outboard motor 50 through a water inlet (not shown) disposed at a side wall of the lower unit 62. The water pump 110 is mounted about the driveshaft 74 and is driven by the driveshaft 74. The water introduced by the water pump 110 is supplied to the engine 66 through water conduits and circulates within water jackets in the engine 66. The water thence is discharged outside of the motor 50. Portions of the driveshaft housing 60 and lower unit 62 around the water pump 110 have less heat because the pump 110 acts as a heat sink. Because the cooling system is conventional and hence well known in the art, a further description is not believed to be necessary to permit those skilled in the art to practice the invention.

Figure 4:
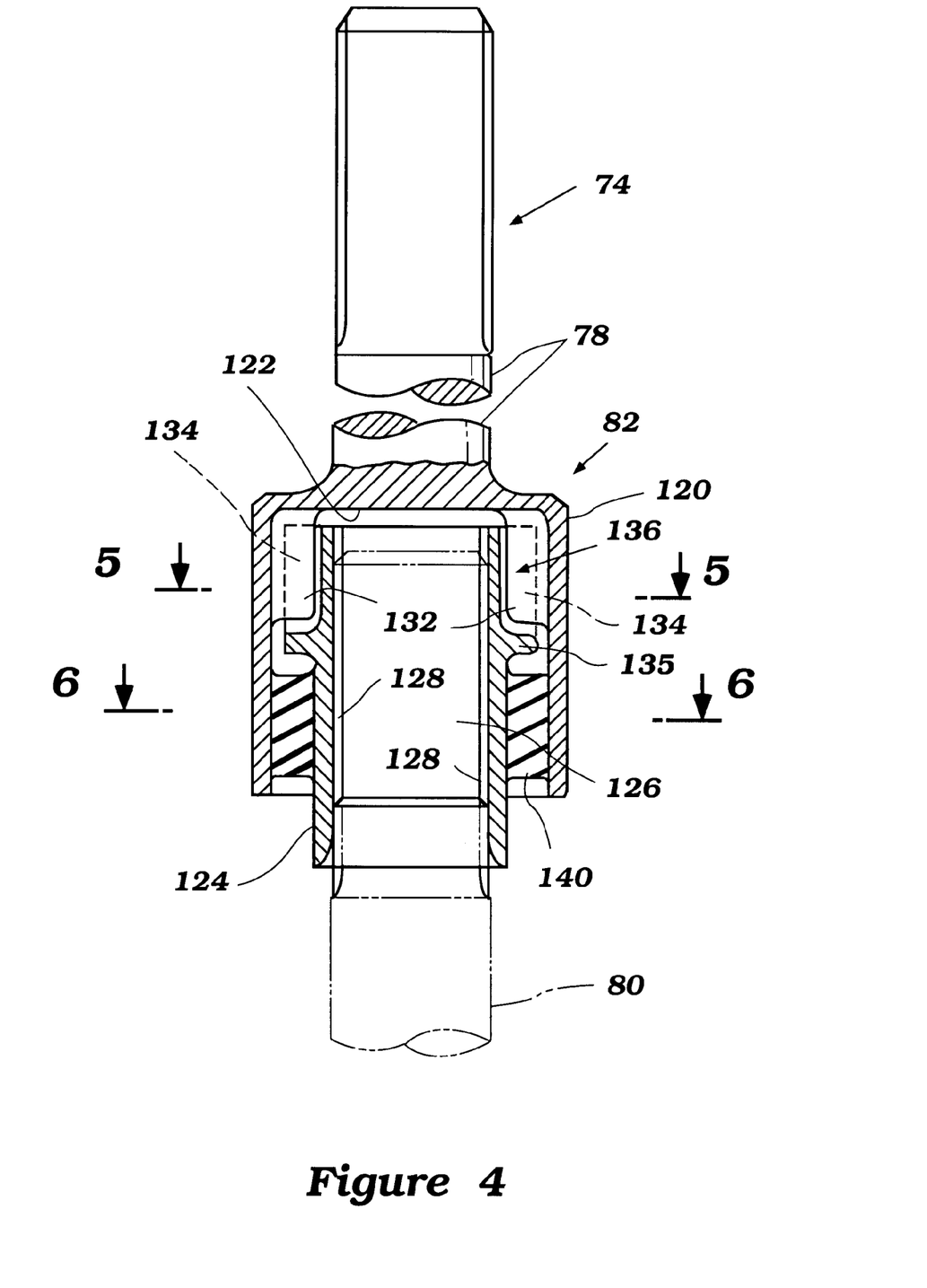
FIG. 4 is a cross-sectional, side elevational view showing a coupling in a first embodiment of 4 power transmission system.
Figure 5:
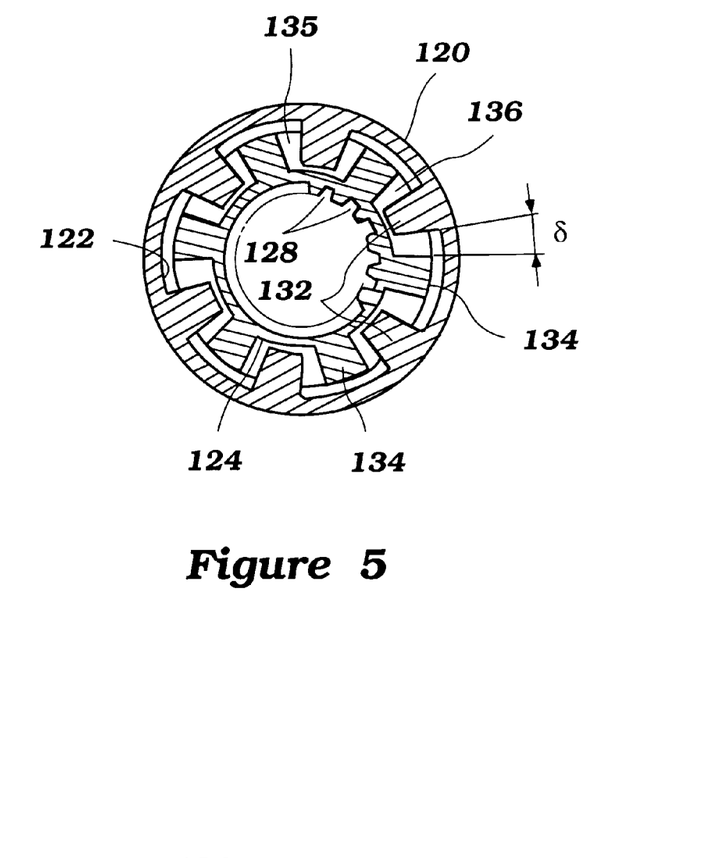
FIG. 5 is a cross-sectional view showing the same coupling taken along the line 5—5 in FIG. 4.
Figure 6:
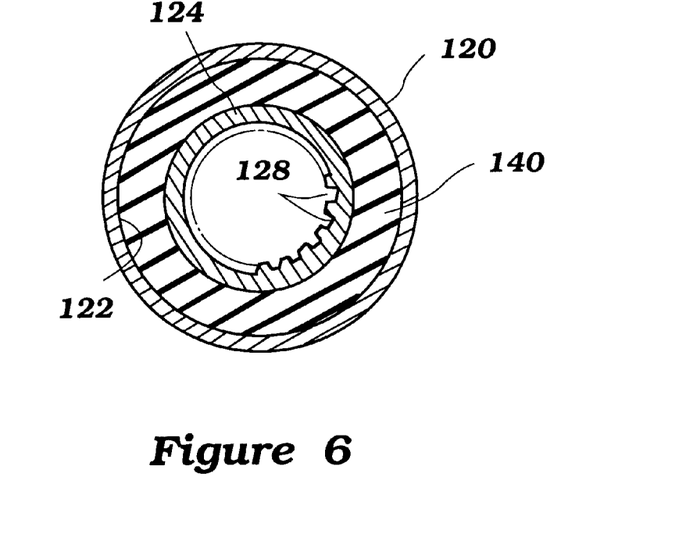
FIG. 6 is a cross-sectional view showing the same coupling taken along the line 6—6 in FIG. 4.

With reference to FIGS. 4 to 6, the coupling assembly 82 includes a damper coupling construction. The lower end of the drive section 78 is provided with a depending flange 120 that defines an internal cavity 122. As seen in FIGS. 5 and 6, the flange 120 and cavity 122 have a circular shape. A coupling member or outer shaft member 124 that has also a circular shape is inserted into the internal cavity 122. The coupling member 124 is one piece that defines an upper end portion of the driven section 80. Another piece defining the upper end portion with the coupling member 124 is a projecting portion 126 that extends from the driven shaft 80. The coupling member 124 has spline key ways 128 on its inner surface, while the projecting portion 126 has also spline key ways 128 on its outer surface. The projecting portion 126, therefore, can be joined together with the coupling member 124 by the spline connection and rotate together.

At the upper half or bottom portion of the cavity 122 of the flange 120, six teeth 132 that have a generally rectangular configuration extend generally inwardly toward the center of the cavity 122. The inward teeth 132 are arranged to be side by side at a 60° pitch (i.e., evenly spaced about the cavity 122 at 60° intervals). Meanwhile, at the upper half portion of the coupling member 124 has six teeth 134 that have a generally rectangular configuration and that also extend generally outwardly and radially from the outer surface of the coupling member 124. As best seen in FIG. 4, a flange portion 135 extends from the outer surface of the coupling member 124 and the outward teeth 134 extend upwardly therefrom in the illustrated embodiment. The outward teeth 134 are arranged to be side by side at a 60° pitch like the inward teeth 132. As seen in FIG. 5, the inward teeth 132 and the outward teeth 134 are disposed alternately to be engageable with each other and define a toothed connection or mechanism 136.

An elastic or resilient member 140, which has a circular shape, is provided at the lower halves of the flange cavity 122 and the coupling member 124. The coupling by this elastic member 140 provides a lost motion connection. The elastic member 140 is made of, for example, rubber material. In the illustrated embodiment, the elastic member 140 is rigidly affixed to the flange 120 and the coupling member 124, i.e., between the inner cavity 122 of the flange 120 and the outer surface of the coupling member 124, by a baking process.

The baking process is done by the following acts. First, the inner cavity 122 is formed at the lower end of the depending flange 120. Both of the flange 120 and the coupling member 124 are formed with the toothed mechanism 136. That is, the flange 120 is formed with the inward teeth 132, while the coupling member 124 are formed with the outward teeth 134. The coupling member 124 is, then, inserted into the cavity 122. In this step, these components are positioned relative to each other such that a fixed space δ (see FIG. 5) is defined between each adjacent inward tooth 132 and outward tooth 134. Under this condition, rubber material as the elastic member 140 is inlaid between the cavity 122 of the flange 120 and the outer surface of the coupling member 124. Then, the rubber material is heated or baked to be secured to both of the flange 120 and the coupling member 124. Therefore, after this forming process, the coupling member 124 is rigidly affixed to the inner cavity 122 of the flange 120 by the elastic member 140. Moreover, the inward and outward teeth 132, 134 of the toothed mechanism 136 are disposed side by side alternately with the fixed spaces δ.

The driveshaft 74 completes when the projecting portion 126 of the driven section 80 is attached to the coupling 82 via the splined connection with the coupling member 124. Although the flange 120 is unified with the drive section 78 in this illustrated embodiment, it can be separately formed and joined with the drive section 78 by spline connection like the coupling member 124. The coupling member 124 also can be unified with the driven section 80, and/or the flange 120 and drive section 78 can be separately made. These constructions increases detachability of the drive and driven sections 78, 80 of the driveshaft 74.

When the driven section 80 is splined with the coupling member 124, an axis of the drive section 78 coincides with an axis of the driven section 80 and these axes define a common axis. As described above, the toothed mechanism 136 exists at the upper half portion of the coupling assembly 82 and the elastic member 140 exists at the lower half portion thereof. That is, both of the coupling mechanisms 136, 140 are spaced apart from each other in a direction along the common axis. The positions of these coupling mechanisms 136, 140 can be interchanged, i.e., the toothed mechanism 136 can be positioned below the elastic member 140. In addition, a couple of elastic member 140 can be disposed so as to interpose the toothed mechanism 136, i.e., portions of the first coupling mechanism 136 being disposed above and below the second coupling mechanism 140.

Also, the arrangement of the flange 120 and the coupling mechanism 124 relative to the drive section 78 and driven section 80 are completely interchangeable. That is, the drive section 78 can be provided with the coupling member 124, while the driven section 80 can be provided with the flange 120, including the inner cavity 122. This construction is configured by inverting the coupling assembly 82 shown in FIG. 4.

Still with reference to FIGS. 4 to 6, when the engine 66 operates, the drive section 78 of the driveshaft 74 is driven by the output shaft 72 of the engine 66. The driving force of the drive section 78 is transferred to the driven section 80 through the elastic member 140 first by shearing stress thereof. That is, the elastic member 140 provides a lost motion of the driven section 80 because of its resilience. This power transmission by the elastic member 140 is provided under low speed and low load conditions. However, when the driving loads increase, the lost motion reaches a predetermined level and then the inward and outward teeth 132, 134 engage with each other. The torque of the drive section 78 is hence transferred to the driven section 80 through the toothed mechanism 136 from this moment. More specifically, with increase of the driving loads, the elastic member 140 is compressed and the spaces δ between the inward teeth 132 and the outward teeth 134 become small and at last these teeth 132, 134 contact with each other. At this moment, the coupling by the elastic member 140 is overridden by the coupling by the toothed mechanism 136 and the driving force of the drive section 78 is transferred solely through the toothed mechanism 136.

Generally, the driving loads increase when the propeller 86 rotates in the water. At the initial moment of its rotation, the driving loads are the maximum and then decrease gradually if the rotational speed is stable. However, when the speed increases, the driving loads also increase. This is because that water has viscosity, even though it is not so large, and impedes the propeller 86 rotating. The lost motion occurs when the driven section 80 cannot follow the rotation of the drive section 78 due to this resistance.

The power from the engine 66 is thus transmitted to the driven section 80 of the driveshaft 74 through the drive section 78 and the coupling assembly 82. If, however, the shift mechanism 92 is set at the neutral position, the power will not be transferred to the propeller shaft 84. The propeller 86 does not rotate and hence the associated watercraft 106 is not propelled. Under this condition, it is readily understood that the driving loads do not exist. Therefore, the drive section 78 and the driven section 80 are coupled together only through the elastic member 140 even though the engine speed is very high.

If the shift mechanism 92 is shifted to, for example, the forward position, the driving loads is abruptly applied. Particularly, at the very moment when the shift mechanism 92 is shifted into the forward position, a large load or shock is produced.

Figure 7:
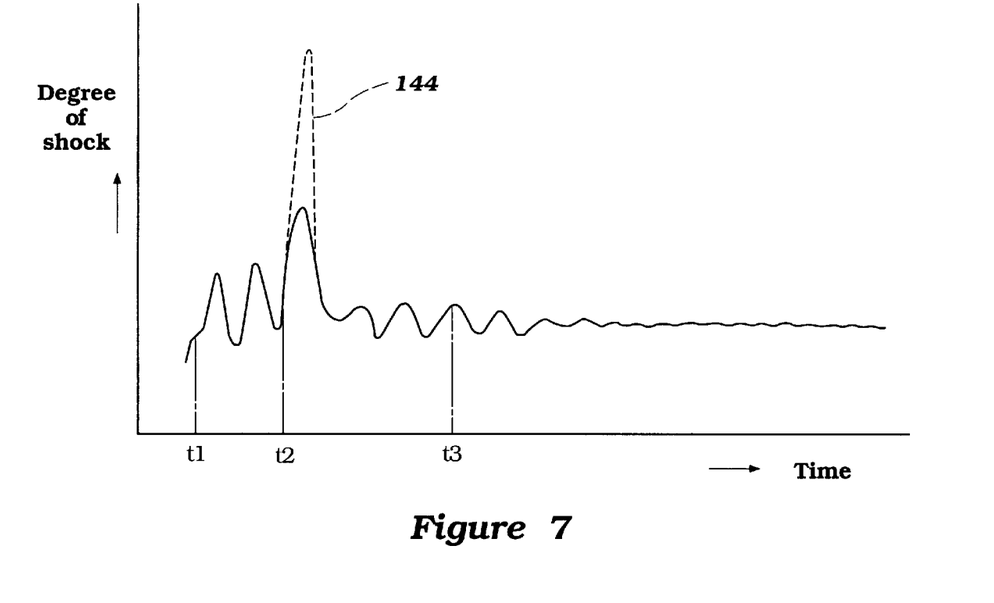
FIG. 7 is a graph showing degree of shock versus time.

FIG. 7 illustrates this situation. The vertical axis of the graph indicates degree of shock which is proportional to the change rate of loads. The degree of shock changes with elapse of time that is indicated at the horizontal axis.

In the figure, the operator starts shifting the shift mechanism 92 at the timing t1. At this moment, although the shift rod 96 sets to move, no engagement is completed. With a small time lag and at the timing 2, the shift mechanism 92 is engaged in the forward drive position. If the elastic member 140 were not involved in the drive train, a huge shock would be produced at this timing t2 as illustrated with the reference numeral 144 and by the dotted line. This shock 144 is transmitted to the associated watercraft 106 and jolts the occupants giving them an uncomfortable feeling. However, since the coupling assembly 82 in this embodiment has the elastic member 140 that produces the lost motion, the shock 144 is absorbed quite effectively by deflection of the elastic member 140 which occurs shearing stress thereof and the degree of the shock is reduced as shown in the solid line in FIG. 7. The fluctuation energy absorbed by the elastic member 140 is exchanged to heat energy, then dissipated.

At the timing t3, the inward teeth 132 and outward teeth 134 of the toothed mechanism 136 engage with each other because the driving loads increase. Before the inward and outward teeth 132, 134 engage with each other, the elastic member 140 couples the drive and driven sections 78, 80 as noted above. In this stage, the transmission torque from the drive section 78 to the driven section 80 decreases and then subsequently increases after the timing t3.

Figure 8:
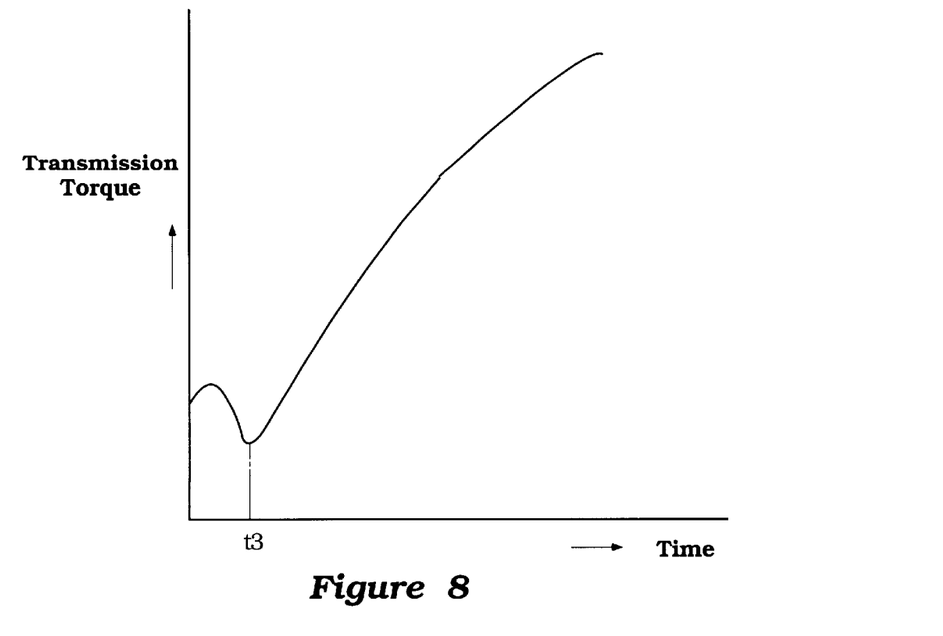
FIG. 8 is a graph showing transmission torque versus time.

This situation is illustrated in FIG. 8. In this figure, the vertical axis of the graph indicates transmission torque and it changes with elapse of time that is indicated at the horizontal axis.

Because the power is transmitted to the driven section 80 from the drive section 78 by the deflection of the elastic member 140 before the timing t3, the transmission torque decreases. However, when the deflection amount reaches the size of the space δ that exists between each inward teeth 132 and outward teeth 134, these teeth 132, 134 engage with each other and the power is transmitted only through the toothed mechanism 136. This timing corresponds to the timing that the lost motion of the elastic member 140 reaches the predetermined level. All members of this toothed mechanism 136 are rigid. The drive section 78 and driven section 80 are, thus, in rigid contact with each other as a "unified" shaft after the timing t3 and the transmission torque can increase thereafter. Then, with increase of the engine speed, the transmission torque also correspondingly increase.

Incidentally, the degree of shock fluctuates as shown in FIG. 7. This is because driving torque of the engine 66 fluctuates by nature and this torque fluctuation appears as relatively large when the engine speed is small. However, the fluctuation is also dumped by the elastic member 140 and then disappears with increasing engine speed.

Since the toothed mechanism 136 and the elastic member 140 are separately disposed in the direction along the common axis of the driveshaft 74, the diameter of the elastic member 140 can be small as possible. The rigid fixing of the member 140 (by baking) assists this effect further. Additionally, a rigid coupling such as the toothed mechanism 136 can be employed in this arrangement. Accordingly, the shock that is generated when the shift mechanism 92 is shifted to the forward or reverse position can be quite effectively absorbed by the elastic member 130 that has a diameter as small as possible, thereby providing a compact coupling between the two sections of the driveshaft. Also, after the driving loads reach a predetermined value, the power from the engine 66 is transmitted securely by the toothed mechanism 136.

In addition, the coupling assembly 82 in this embodiment is positioned directly above the water pump 110. Since portions around the water pump 110 act as a heat sink as noted above, the coupling assembly 82 can be well cooled. This cooling effect can extend the life of the elastic member 140.

The coupling assembly 82 can be located at any portions of the shafts 74, 84. For instance, FIG. 3 illustrates that the assembly 82 is positioned at the connecting portion of the driveshaft 74 with the output shaft 72 by the reference numeral 146. Since this portion 146 can be easily arranged to be lubricated, the coupling assembly 82 can be well lubricated.

FIG. 3 shows another portion where the coupling assembly can be positioned. This portion exists on the propeller shaft 84 and is indicated with the reference numeral 148. This embodiment of another coupling assembly 158 will be described in connection with reference to FIG. 9. The same components and members which have been already shown in FIGS. 3 to 6 and described above are assigned with the same reference numerals and will not be described again. The previous description of such components thus are to apply equally to the corresponding components in the present embodiment, except where noted otherwise.

Figure 9:
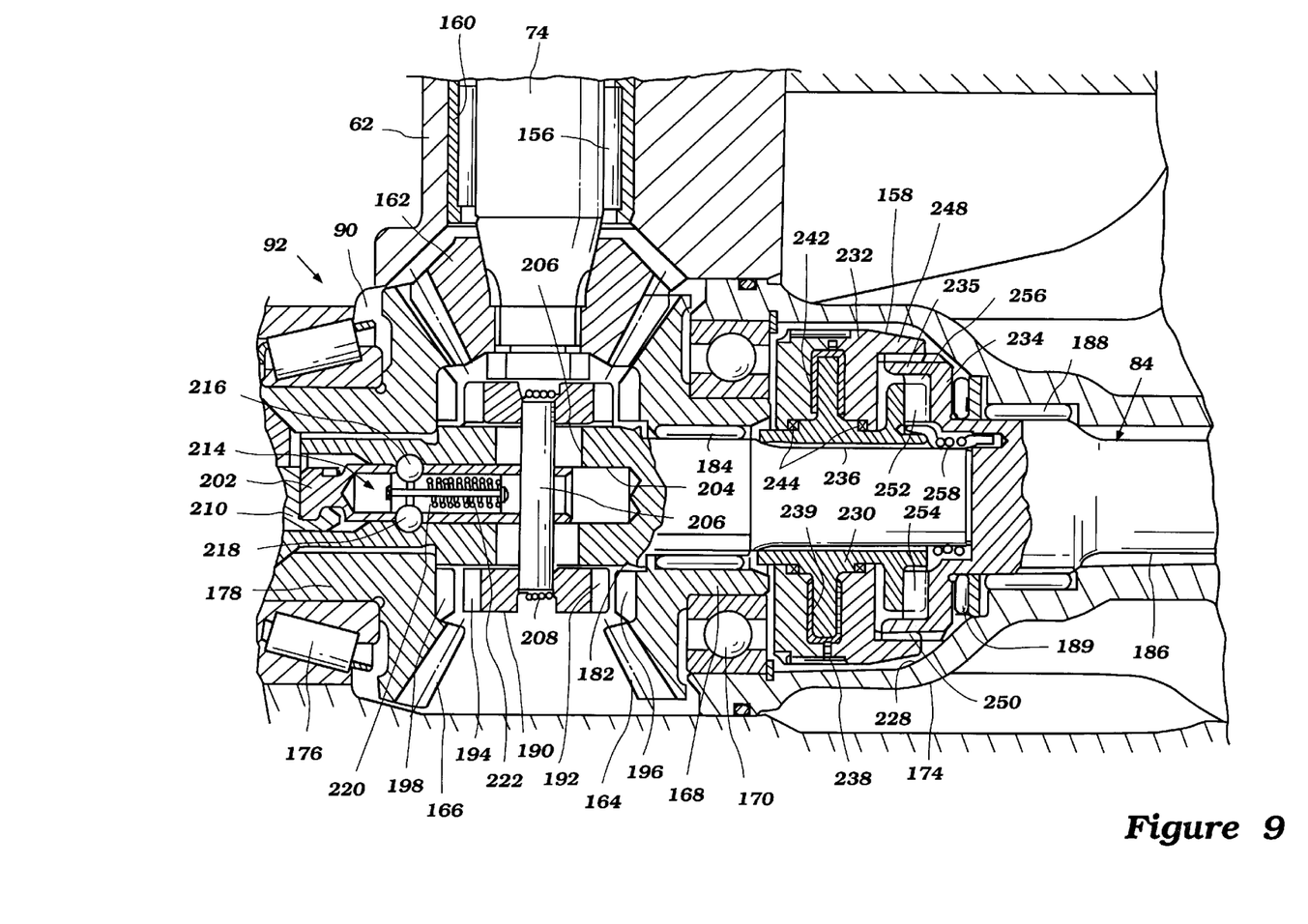
FIG. 9 is a cross-sectional, side elevational view showing a forward, neutral, reverse transmission and shift mechanism including another coupling arrangement configured in accordance with another preferred embodiment of the present invention.

The driveshaft 74 is journaled by a needle bearing 159 in a vertically extending axial opening 160. A driving bevel gear or pinion 162 is affixed to a lower end of the driveshaft 74. The driving bevel gear 162 drives a pair of diametrically opposed driven bevel gears 164, 166, which are forward drive gear and reverse drive gear, respectively. The forward drive gear 164 has a hub portion 168 that is journaled by an anti-friction ball bearing 170. The ball bearing 170 is contained in the forward end of a bearing carrier 174. The bearing carrier 174 is suitably affixed within a horizontally extending bore formed in the housing of the lower unit 62. The reverse drive gear 166 is journaled by a propel bearing 176 that engages a hub portion 178 and the housing of the lower unit 62.

The propeller shaft 84 comprises a drive member 182 and a driven member 186. A forward portion of the drive member is received in the hub 178 of the reverse drive gear 166 and a rearward portion is received in the hub 168 of the forward drive gear 164 with a needle bearing 184. The driven member 186 is received in the bearing carrier 174 with needle bearings 188 and 189. The drive member 182 and driven member 186 are connected by the coupling assembly 158 that will be described shortly.

A dog clutching sleeve 190 is provided between the forward and rearward portions of the drive member 182 and has a splined connection with this drive member 182. The clutching sleeve 190 is positioned between the bevel gears 164, 166. The dog clutching sleeve 190 has dog clutching teeth 192 and 194, respectively, which face corresponding dog clutching teeth 196 and 198 of the bevel gears 164, 166, respectively. Hence, when the dog clutching sleeve 190 is slid axially along the propeller shaft 84, in a manner to be described, in the forward drive position, its dog clutching teeth 192 engage the dog clutching teeth 196 of the forward drive gear 164 and the forward gear 164 will be rotatably coupled to the drive member 182 of the propeller shaft 84. The propeller 86, thus, is driven in a forward drive condition. When the dog clutching sleeve 190 is slid forwardly, its dog clutching teeth 194 engage the dog clutching teeth 198 of the reverse drive gear 166, and the reverse gear 166 and then the propeller 86 will be driven in a reverse drive condition.

In order to shift the dog clutch between forward, neutral and reverse positions, a shift plunger 202 is slideably supported within a bore 204 formed in the forward portion, wholly therethrough, and the rearward portion, in part, of the drive member 182 of the propeller shaft 84. A shift pin 206 couples the shift plunger 202 to the dog clutching sleeve 190. There is provided an elongated slot 206 in the drive member 182 of the propeller shaft 84 so as to permit axial movement of the pin 206 while, at the same time, insuring the dog clutching sleeve 190 rotates with the propeller shaft 84. A torsional spring 208 encircles a groove formed in the dog clutching sleeve 190 so as to hold the pin 206 in position. The shift plunger 202 is coupled to a shift actuating member 210 that is movable by the shift rod 96. When shift rod 96 is operated, the shift actuating member 210 is reciprocated by the shift actuating member 210.

A detent mechanism 214 comprising a plurality of detent balls 216 are contained within the forward portion of the shift plunger 202. The detent balls 216 are normally urged into engagement with detent recesses 218 of the drive member 182 of the propeller shaft 84 by a spring loading mechanism 220 including a spring 222 for holding the shift mechanism 92 in its neutral position. As a result, there will be snap action of the dog clutching sleeve 190 when shifting into the forward or reverse drive position to assist engagement between the dog clutch and the corresponding gear.

The structure described above is well known in the art except for that the propeller shaft 84 is divided into the drive member 182 and driven member 186 and that the coupling assembly 158 is disposed therebetween. A further description therefore is not believed to be necessary. In fact, the structure is applicable to the first embodiment also described above if the propeller shaft 84 is not divided. The coupling assembly 158 in the illustrated embodiment will be now described.

The coupling assembly 158 is enclosed in an internal cavity 228 formed within the bearing carrier 174 of the lower unit 62. The coupling assembly 158 includes a first coupling member 230, a second coupling member 232 and a coupling section 234 formed at the forward portion of the driven member 186. The coupling section 234 has a cup-like configuration and a holder portion 235 is formed there so as to extend forwardly. The first coupling member 230 has a splined connection 236 with the drive member 182 of the propeller shaft 84 and has a circular flange 238 extending outwardly and normal to the axis of the propeller shaft 84 that is a common axis of the drive and driven members 182, 186.

The second coupling member 232 comprises two pieces which are mated at the flange 238 to form a recess 239 for enclosing the flange 238 therein with a small gap or space 242. The gap 242 is filled with viscosity holding material such as, for example, oil or liquid synthetic resin that has relatively high viscosity. The gap 242 is sealed with seal members 244 so that the viscosity holding material will not leak out from the gap 242. The second coupling member 232 includes a holder portion 248 which extends rearwardly and has a spline connection 250 at its inner surface with the holder portion 235 of the coupling section 236 at its outer surface.

The first coupling member 232 elongates rearwardly and includes teeth 252 that are disposed within a space formed in the cup-like configuration of the coupling section 234 and extend rearwardly. The holder portion 235 of the coupling section 234 of the driven member 186, in turn, includes teeth 254 corresponding to the teeth 252 that are also disposed within the space formed in the cup-like configuration of the coupling section 234. Both teeth 252 and 254 are engageable with each other and hence define a toothed mechanism 256. However, a torsion spring 258 is provided between the first coupling member 230 and the coupling section 234 of the driven member 186 so as to hold the teeth 252, 254 not to engage with each other under the static condition of the propeller shaft 84. The internal cavity 228 is filled with lubricant. The toothed mechanism 256, spline connections 236, 250 and torsion spring 258 are well lubricated at all times.

The circular flange 238 of the first coupling member 230, the section of the second coupling member 232 where the flange 238 is provided with the gap 242 and the viscosity holding material filling the gap 242 define a first coupling mechanism. The teeth 252 of the first coupling member 230, the teeth 254 of the coupling section 234 define a second coupling mechanism as well as the toothed mechanism 256. The first and second coupling mechanisms are spaced apart from each other in a direction of the common axis of the drive and driven members 182, 186 that is the axis of the propeller shaft 84.

When the dog clutching sleeve 190 of the shift mechanism 92 is in the neutral position that is shown in FIG. 9, both of the bevels gears 164, 166 idle and no power is transmitted to the propeller shaft 84 from the driveshaft 74. The propeller shaft 84 does not rotate accordingly.

When the dog clutch sleeve 190 is shifted to, for example, the forward drive position, the dog clutching teeth 192 of the sleeve 190 engage with the dog clutching teeth 196 of the forward drive gear 164 and the power is transmitted to the drive member 182 of the propeller shaft 84 through the bevel gear 162, bevel gear 164, dog clutching sleeve 190 and shift pin 206. In the initial state, the drive member 182 is connected to the driven member 186 by the first coupling mechanism including the viscosity holding material. This first coupling mechanism provides a lost motion of the driven member 186 because of the viscosity holding material. Therefore, although a large load of the propeller 86 is abruptly generated at the driven member 186, this sudden load or shock is absorbed by the lost motion and not transmitted to the associated watercraft 106 and the occupants will not have any bad feeling.

With increase of the engine speed, the drive member 182 rotates rapidly and the lost motion becomes very large. When the lost motion reaches a predetermined level, the teeth 252, 254 of the toothed mechanism 256 engage with each other and this second coupling mechanism solely couples the drive member 182 to the driven member 186. That is, the first coupling mechanism is overridden by the second coupling mechanism. Since the toothed mechanism 256 as the second coupling mechanism is completely rigid, the lost motion will no longer appear and the power from the driveshaft 74 is securely transmitted to the propeller shaft 84.

In this embodiment, the viscosity holding material is used instead of the elastic member 140 that is used in the first embodiment. It is advantageous because a coefficient of viscosity can be easily selected. This means that resilience of the first coupling mechanism is also easily selected because the resilience is proportional to the coefficient of viscosity. Also, since oil or liquid synthetic resin is employed as the viscosity holding material in this embodiment, it can be enclosed in a relatively narrow space like the gap 242. Because, although relatively large surface area is necessary for enhancing the resilience, large volume is not required for that purpose. Thus, compactness of the coupling assembly 158 is well kept and it can be disposed in the small cavity 228 defined in the housing of the bearing carrier 174.

The embodiments of the present invention described above thus illustrate two suitable types of damping couplers that can be used to transfer low level torque while damping coupling shock when the transmission is shifted. Other types of damping coupler can also be employed with the present power transmission system.

Of course, the foregoing description is that of preferred embodiments of the invention, and various changes and modifications may be made without departing from the spirit and scope of the invention, as defined by the appended claims.

What is claimed is:

1. A power transmission system for a marine propulsion unit comprising a first shaft, a second shaft driven by said first shaft, said first and second shafts having a common axis, a first coupling mechanism and a second coupling mechanism for coupling said first and second shafts, said second coupling mechanism being spaced apart from said first coupling mechanism in a direction along the common axis, said first and second shafts being coupled with each other selectively by at least one of said first and second coupling mechanisms, said first coupling mechanism including an elastmeric member disposed between said first and second shafts in a radial direction relative to the common axis.

2. A power transmission system as set forth in claim 1, wherein said elastmeric member transmits power from said first shaft to said second shaft by shearing stress of said elastmeric member.

3. A power transmission system as set forth in claim 1, wherein said elastmeric member is directly connected with both of said first and second shafts.

4. A power transmission system as set forth in claim 3, wherein said elastmeric member is baked with both of said first and second shafts.

5. A power transmission system as set forth in claim 1, wherein said elastmeric member is made of rubber material.

6. A power transmission system as set forth in claim 1, wherein said second coupling mechanism includes outward teeth extending generally radially from one of said first and second shafts and inward teeth extending generally radially from the other one of said shafts, and said outward teeth and said inward teeth are engageable with each other.

7. A power transmission system as set forth in claim 6, wherein said outward teeth and said inward teeth are disconnected with each other when said first shaft is driven with torque smaller than a predetermined value.

8. A power transmission system as set forth in claim 7, wherein said outward teeth and said inward teeth are urged apart from each other by said first coupling mechanism.

9. A power transmission system as set forth in claim 1, wherein said elastmeric member is directly connected with both of said first shaft and said second shaft.

10. A power transmission system as set forth in claim 1, wherein said second coupling mechanism includes teeth disposed on the respective first and second shafts, and said teeth engage with one another when said first shaft is driven with torque greater than a predetermined value.

11. A power transmission system as set forth in claim 1, wherein at least one of said first coupling mechanism and said second coupling mechanism is disposed in a coupling housing filled with lubricant.

12. A power transmission system as set forth in claim 1, wherein at least one of said first and second shafts includes an inner shaft member the other of the first and second shafts including an outer shaft member, said inner shaft member and said outer shaft member being splined with each other.

13. A power transmission system as set forth in claim 1, wherein said second shaft includes an inner shaft member and said first shaft includes an outer shaft member, said inner shaft member and said outer shaft member being splined with each other.

14. A power transmission system as set forth in claim 1, wherein said first coupling mechanism couples said first and second shafts and is configured to resiliently deform so as to allow for relative angular movement between said first and second shafts, and said second coupling mechanism couples said first and second shafts and is configured to limit the relative angular movement to a predetermined range.

15. A power transmission system as set forth in claim 1, wherein said second coupling mechanism couples said first and second shafts when said second shaft rotates relative to said first shaft by a rotational amount greater than a predetermined level, and said first coupling mechanism couples said first shaft and second shaft when said second coupling mechanism does not couple said first and second shafts.

16. A power transmission system as set forth in claim 1, wherein said second coupling mechanism is prevented from contacting said first shaft to said second shaft when a relative angular position between said second shaft and said first shaft is less than a predetermined level.

17. A power transmission system as set forth in claim 16, wherein said elastmeric member is configured to maintain a gap between said second coupling mechanism and said first shaft when no torque is being applied to the elastmeric member.

18. A power transmission system as set forth in claim 1, wherein said first and second coupling mechanisms are disposed in proximity to each other to define a coupling assembly.

19. A power transmission system as set forth in claim 18, wherein said second shaft includes a plurality of shaft members, and said coupling assembly is positioned on the final shaft member which directly drives said propulsion device.

20. A power transmission system as set forth in claim 18, wherein said powering element includes an internal combustion engine, said internal combustion engine is located atop of said marine propulsion unit and includes an output shaft extending generally vertically, said marine propulsion unit has a driveshaft extending from said output shaft and generally vertically, said first shaft and said second shaft define said driveshaft, and said coupling assembly is positioned on said driveshaft.

21. A power transmission system as set forth in claim 20 wherein said marine propulsion unit includes a water pump for supplying cooling water to said internal combustion engine, said water pump is placed on said driveshaft to be driven thereby, and said coupling assembly is positioned directly above said water pump.

22. A power transmission system as set forth in claim 2, wherein said powering element includes an internal combustion engine, said internal combustion engine is located atop of said marine propulsion unit and includes an output shaft extending generally vertically, said marine propulsion unit has a driveshaft extending from said output shaft and generally vertically, and said coupling assembly is positioned between said output shaft and said driveshaft.

23. A power transmission system as set forth in 1, wherein the first and second shafts together form at least a portion of a propulsion shaft that drives a propulsion device of the marine propulsion unit.

24. A coupling for a power transmission system having a drive shaft and a driven shaft, comprising a first section connecting said drive shaft with said driven shaft under normal operating conditions, a second section engaging said drive shaft with said driven shaft only when said driven shaft is driven by said drive shaft under a driving load condition that is greater than a predetermined level, said drive and driven shafts having a common axis, said second section being spaced apart from said first section in a direction along the common axis, said first section including an elastmeric member disposed between said drive and driven shafts in a radial direction relative to the common axis.

25. A coupling as set forth in claim 24, wherein said resilient member transmits power from said first shaft to said second shaft by shearing stress of said resilient member.

26. A coupling as set forth in claim 24, wherein said second section includes teeth disposed on the respective drive and driven shafts, said teeth engage with one another when said drive shaft is driven with torque greater than a predetermined value.

27. A coupling as set forth in claim 26, wherein said first section prevents said teeth from engaging with each other under driving load condition less than a predetermined level.

28. A coupling as set forth in claim 24, wherein one of said drive and driven shafts has a depending flange defining an internal cavity and the other one of said drive and driven shafts extends in part into said internal cavity.

29. A coupling as set forth in claim 24, wherein a coupling arrangement is formed by the combination of said first section and said second section, said first section includes a resilient member made of rubber material, said second section includes a second mechanism having teeth, and said coupling arrangement is formed by the acts of forming a recess in one of said drive shaft and said driven shaft, inserting the other shaft therein under the condition that said teeth have fixed spaces with each other, inlaying said rubber material in said first section, and heating said rubber material to secure it to both of said drive shaft and said driven shaft within said recess.

30. An outboard motor comprising a powering element, a first shaft coupled with the powering element, a second shaft driven by the first shaft, a propulsion device coupled with the second shaft, the first and second shafts having a common axis, and first and second coupling mechanisms arranged to couple the first and second shafts, the first and second coupling mechanisms being spaced apart from one another in a direction along the common axis, one of the first and second coupling mechanisms including an elastmeric member disposed between the first and second shafts in a radial direction relative to the common axis, and the elastmeric member transmitting torque to the second shaft from the first shaft by shearing stress of the elastmeric member.

31. An outboard motor as set forth in claim 30, wherein one of the first and second shafts has a first portion defining a cavity, the other one of the first and second shafts has a second portion extending within the cavity, and the first and second coupling mechanism are defined between the first and second portions.

32. An outboard motor as set forth in claim 31, wherein one of the first and second mechanisms is disposed next to a bottom of the cavity.

33. An outboard motor as set forth in claim 32, wherein the second mechanism is disposed next to the bottom of the cavity.

34. An outboard motor as set forth in claim 31, wherein the first shaft has the first portion.

35. An outboard motor as set forth in claim 34, wherein the first portion has a standing wall extending from the bottom generally in parallel to the common axis.

36. An outboard motor as set forth in claim 35, wherein the second coupling mechanism includes first teeth based on both the bottom and the standing wall, and second teeth extending from the second portion, and the first and second teeth are engageable with one another under a condition such that a torque greater than a predetermined torque is exerted upon the first shaft.

37. An outboard motor as set forth in claim 31, wherein at least one of the first and second portions is formed with a piece that is separate from the associated first or second shaft, and the piece is coupled with the associated first or second shaft by a spline connection.

38. An outboard motor as set forth in claim 30, wherein the powering element includes an internal combustion engine having an output shaft, and the first shaft is coupled with the output shaft.

39. An outboard motor as set forth in claim 38 additionally including a water pump arranged to supply cooling water to the internal combustion engine, wherein one of the first and second shafts drives the water pump, and at least one of the first and second coupling mechanism is positioned adjacent to the water pump.

40. An outboard motor as set forth in claim 39, wherein the first coupling mechanism is positioned adjacent to the water pump.

41. An outboard motor comprising a powering element, a first shaft coupled with the powering element, a second shaft driven by the first shaft, a propulsion device coupled with the second shaft, the first and second shafts having a common axis, and first and second coupling mechanisms arranged to couple the first and second shafts, the first and second coupling mechanisms being spaced apart from one another in a direction along the common axis, one of the first and second shafts having a first portion defining a cavity, the other one of the first and second shafts having a second portion extending within the cavity, and both the first and second coupling mechanisms are formed between an inner surface of the cavity and an outer surface of the second portion.

42. An outboard motor as set forth in claim 41, wherein one of the first and second mechanisms is disposed between a bottom of the cavity and the other one of the first and second mechanisms.

* * * * *